United States Patent
Tarver

(10) Patent No.: US 7,003,937 B1
(45) Date of Patent: Feb. 28, 2006

(54) MOWER DECK HEIGHT ADJUSTMENT DEVICE

(76) Inventor: Tommy Tarver, 3530 Deer Run Rd., Lake Charles, LA (US) 70611

( * ) Notice: Subject to any disclaimer, the term of this patent is extended or adjusted under 35 U.S.C. 154(b) by 0 days.

(21) Appl. No.: 10/830,507

(22) Filed: Apr. 22, 2004

(51) Int. Cl.
*A01D 34/03* (2006.01)

(52) U.S. Cl. ........................................ 56/17.1

(58) Field of Classification Search ........... 56/17.1, 56/15.2, 14.9; 403/3, 4, 324
See application file for complete search history.

(56) References Cited

U.S. PATENT DOCUMENTS

| | | | |
|---|---|---|---|
| 302,519 A * | 7/1884 | Parsons | 378/65 |
| 1,495,913 A * | 5/1924 | Lobuono | 411/75 |
| 2,972,274 A * | 2/1961 | La Bombard et al. | 411/337 |
| 3,080,184 A * | 3/1963 | Hays | 403/119 |
| 3,677,574 A | 7/1972 | Cyr | |
| 4,311,428 A * | 1/1982 | Arnold | 414/723 |
| 4,769,933 A * | 9/1988 | Dejana | 37/231 |
| 4,840,020 A | 6/1989 | Oka | |
| 5,138,825 A | 8/1992 | Trefz et al. | |
| 5,351,467 A | 10/1994 | Trefz et al. | |
| 5,787,991 A | 8/1998 | Tuttle | |
| 5,816,033 A | 10/1998 | Busboom et al. | |
| 6,347,502 B1 | 2/2002 | deVries | |
| 6,494,028 B1 | 12/2002 | Moore | |
| 6,685,406 B1 | 2/2004 | Whitney et al. | |

OTHER PUBLICATIONS

Brochure "Lazer Z HP", Model LHP4418KC—Ser. No. 192566-eXmark Mfg. Co., Inc.,—1997, 1998, Beatrice, NE 68310.

* cited by examiner

*Primary Examiner*—Thomas B. Will
*Assistant Examiner*—Alicia Torres
(74) *Attorney, Agent, or Firm*—C. Dean Domingue; Robert L. Waddell; Ted A. Anthony

(57) ABSTRACT

An adjustment pin for making precision adjustments to the cutting deck height of a lawn mower having a cutting deck height adjustment mechanism that employs a lever, a lever support bracket having lever set holes. The adjustment pin has an elongated stem of a uniform diameter. Disposed along the stem of the pin is a plurality of pin adjustment portions. These adjustment portions each have a successively reduced diameter with respect to the pin stem diameter. Adjustments to the cutting deck height are accomplished by inserting the pin in a desired lever support bracket set hole and positioning the lever against a desired adjustment portion of the pin stem. The user may make precision adjustments of the deck height depending upon his selection of the lever set hole and the choice adjustment portion of the pin stem on which to set the lever.

3 Claims, 4 Drawing Sheets

MOWER DECK HEIGHT ADJUSTMENT DEVICE

FIELD OF INVENTION

This invention relates to riding lawn mowers. In particular, this invention relates to a pull pin that provides a mechanism for making quick and incremental adjustments to the height of the cutting deck of a lawn mower.

BACKGROUND OF THE INVENTION

Conventional riding lawn mowers often utilize a rotating cutting blade mounted on a cutting deck member to effect the cutting of vegetation. The cutting deck member is typically composed of a blade mounted for rotation about a vertical axis and carried in a housing. The housing includes a deck above the blade and skirts projecting downwardly from the deck to contain the cut material within the housing. The position of the cutting deck member with respect to the running surface helps determine the height of the blade with respect to the ground's surface. Consequently, in order to vary the height of the blade, a means of adjusting the cutting deck member is needed.

Various methods and mechanisms have been utilized to adjust the cutting deck member height. Basic adjustment mechanisms provide for manual adjustment of the cutting deck member and often the use of wrenches and other tools is required. Another means to vary the height of a cutting deck member is the pin-and-receiving-hole mechanism. In such pin-and-receiving-hole mechanisms, the mower cutting deck is suspended at a desired height on a support bracket by means of an adjustment arm and pull pin. Deck height is adjusted by withdrawing a pull pin from an adjustment hole in the bracket that corresponds to a particular height setting. The mower cutting deck is then moved to a desired height setting and the pull pin is inserted into a different adjustment hole that corresponds as closely as possible to the newly desired height setting.

Numerous disadvantages stem from the mower deck height mechanisms mentioned above. One important disadvantage is that the user is limited in his ability to adjust the mower cutting deck height beyond the pre-determined hole spacing established by the mower manufacturer. Fine adjustments of the deck height may not be readily made. This presents a problem in establishing a uniform grass height over large lawns having uneven surfaces or on lawns cut over several hours or days. Consequently a quick, convenient way to make fine adjustments to mower deck height is needed. The present invention addresses this problem.

SUMMARY OF THE INVENTION

The present invention relates to an elongated pull pin used in the pin-and-receiving hole deck height adjustment mechanisms of conventional lawn mowers to make precise adjustments of the cutting blade deck. The elongated pull pin is comprised of a bolt having a stem along an axial centerline of uniform diameter. The pull pin has a first adjustment diameter portion having a first notch or step reduction in the diameter of the stem with respect to the uniform diameter of the pin stem, a second adjustment diameter portion having a second notch or step reduction in the diameter of the stem with respect to the diameter of the first adjustment diameter portion and a third adjustment diameter portion having a third notch or step reduction in the diameter of the stem with respect to the diameter of the second adjustment diameter portion. Subsequent adjustment diameter portions may be provided in a like fashion along the length of the stem of the pull pin.

Positioned between each adjustment diameter portion of the elongated pull pin are detent surfaces or means. These elevated surfaces adjacent to the adjustment diameter portions serve as a detent or retainer means. A bore of a sufficient diameter for receiving a cotter pin or other retention means may be provided on the pin stem to allow the pin to be secured in place as desired by a cotter pin or other securing means.

The elongated pull pin of Applicant's design is particularly suited for height adjusting mechanisms that incorporate a deck lifting or adjustment lever and a deck adjustment support bracket such as those employed in mowers similar to the eXmark LAZER Z HP®, Model Number LHP4419KC. The adjustment lever of this lever and bracket device is mounted to mower deck in such a manner as to allow it to pivot on an arc between surfaces of a deck adjustment support bracket as the mower deck is raised and lowered by the adjustment lever. The deck adjustment support bracket has a series of height adjustment holes positioned on the bracket surfaces along an arc created by the pivotable adjustment lever.

Movement of the adjustment lever raises or lowers the deck height as the lever pivots along the arc of the support bracket. A pin is inserted into a desired hole on the bracket to limit downward movement of the adjustment lever, which then sets the height of the mower deck. Selecting a desired hole in which to insert the pin allows for incremental adjustments in the mower deck height. The adjustments in deck height are limited and controlled by to the hole spacings provided on the support bracket. Incremental adjustments between any given hole spacing may not be made. The inability to make more precise adjustments to the mower deck height limits the ability to make correspondingly precise cuttings to grass height.

The pin of Applicant's present invention provides a height-adjustment mechanism to permit an operator to quickly and easily make additional fine incremental adjustments to the cutting deck height. This is achieved, as shown in the illustrated embodiments, by replacing the manufacturer's pin with the pull pin of Applicant's design. When Applicant's pin is in place, the user then may move the mower deck adjustment lever, and thereby the mower cutting deck, to a desired position relative to the predetermined bracket hole positioned determined by the mower manufacturer. The user may then position the pull pin of Applicant's design in the bracket holes until the desired first, second, third or subsequent adjustment diameter portion of Applicant's pin is in alignment with the deck height adjustment lever. When so aligned the detent surfaces on Applicant's pull pin are engaged with the lever and serve to hold the lever in place along the pin.

Applicant's pin may be utilized in various conventional lawn mowers, with individual height settings corresponding to predetermined pull pin diameters. Applicant's pin does not require the use of wrenches or additional tools to make deck height adjustments and greatly reduces the time associated with changing the position of the cutting deck to achieve a desired cutting height.

It should be apparent to one skilled in the art that various modifications and adaptations can be made to the illustrated embodiments employing various detent means and a plurality of adjustment diameter portions. The objects stated above as well as others will be apparent from the drawings, description, and claims that follow.

BRIEF DISCRIPTION OF THE DRAWINGS

Figure 1:
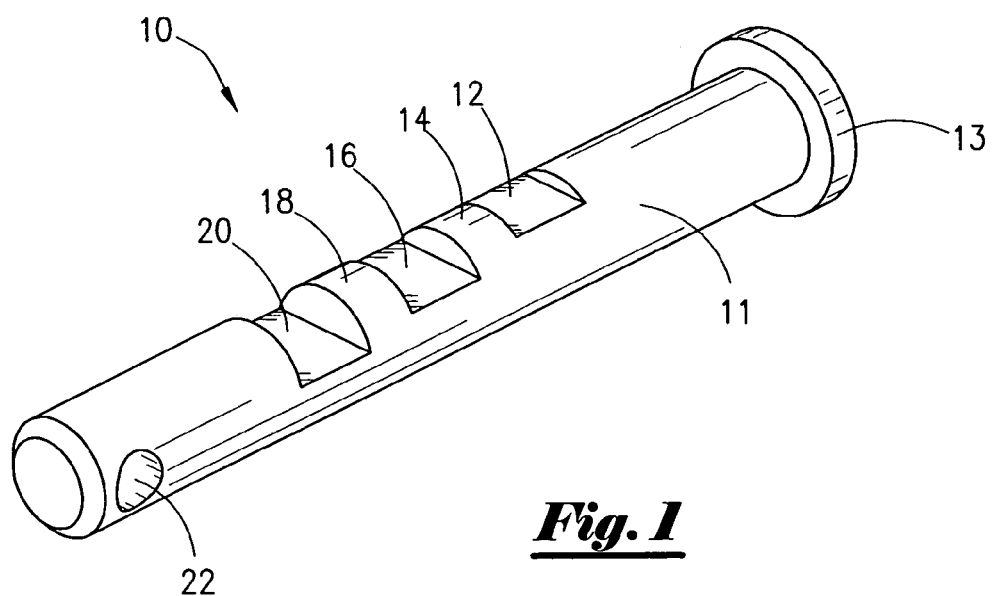
FIG. 1 is a perspective view of the pull pin of Applicants' invention.

| DRAWING - - Reference Numerals | | | |
|---|---|---|---|
| 10 | Pull Pin | 11 | Pin Stem |
| 12 | First Adjustment Diameter Portion | 13 | Pin Head |
| 14 | First Detent Surface | 16 | Second Adjustment Diameter Portion |
| 18 | Second Detent Surface | 20 | Third Adjustment Diameter Portion |
| 22 | Bore | 24 | Mower Cutting Deck |
| 28 | Deck Height Adjustment Mechanism | 30 | Bracket Plates |
| 32 | Bracket Set Hole | 34 | Adjustment Lever |
| 36 | Mower | 110 | Pull Pin |
| 111 | Pin Stem | 113 | Pin Head |
| 112 | First Adjustment Diameter Portion | 114 | First Detent Surface |
| 116 | Second Adjustment Diameter Portion | 118 | Second Detent Surface |
| 120 | Third Adjustment Diameter Portion | 122 | Third Detent Surface |
| 124 | Fourth Adjustment Diameter Portion | | |

DETAILED DESCRIPTION OF THE INVENTION

Figure 2:
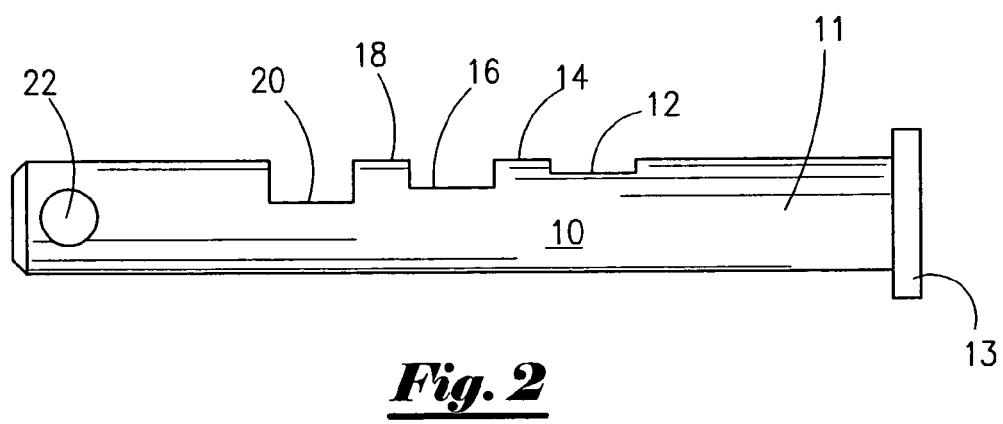
FIG. 2 is a side view of the pull pin of FIG. 1.

Referring now to the drawings and more particularly to FIGS. 1 and 2, there is shown one embodiment of the Applicant's invention. The pull bolt or pin 10 has a stem 11 of a uniform diameter that extends from a pin head 13 along an elongated axial centerline. Disposed along the length of the pin stem 11 is a first adjustment diameter portion 12, a first detent surface 14, a second adjustment diameter portion 16, a second detent surface 18, and a third adjustment diameter portion 20. A bore 22 is provided in the extending in of the pin 10 of a sufficient diameter to allow for attachment of a retention means such as a cotter pin.

The first, second, and third adjustment diameter portions 12, 16, 20 of the pull pin 10 are preferably spaced adjacent to each other to provided a stepped or graded variation in the overall width or diameter of the pin stem 11.

Figure 3:
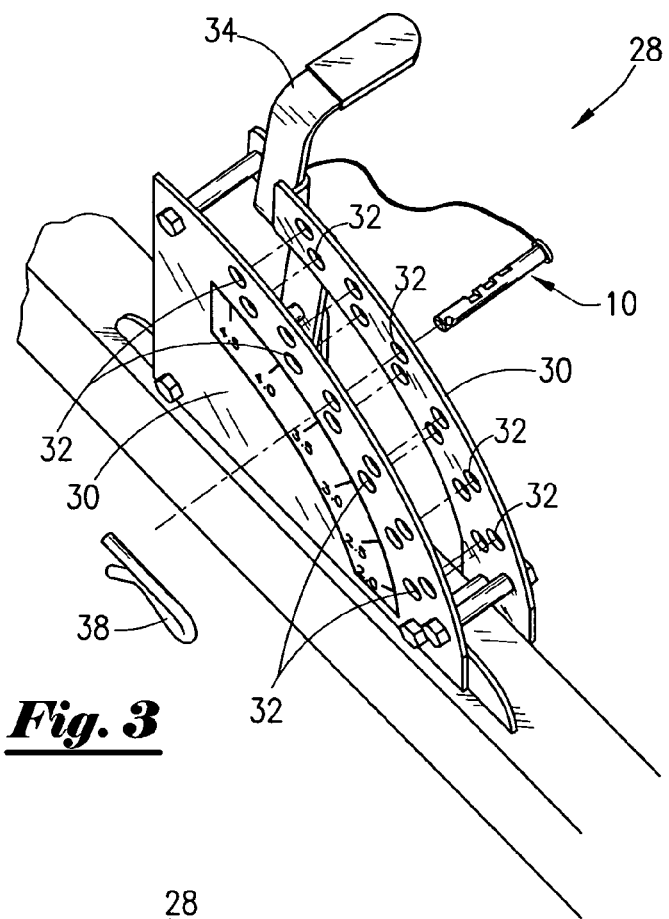
FIG. 3 is perspective view of a deck height adjustment bracket mechanism with the pin of FIG. 1.
Figure 4:
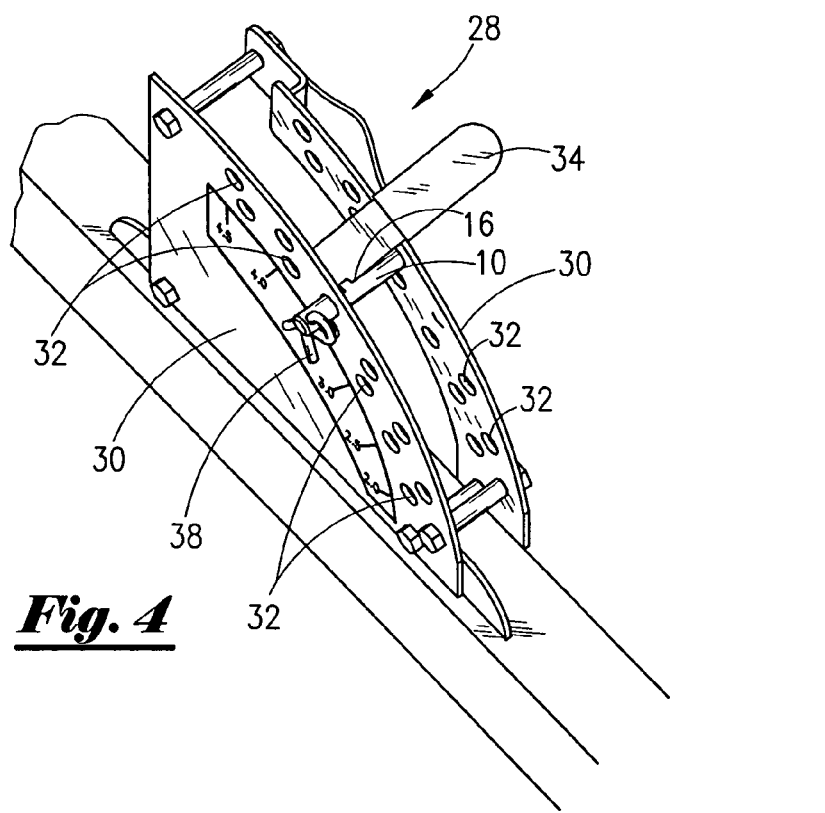
FIG. 4 is a perspective view of the deck height adjustment bracket mechanism with the pull pin of FIG. 1 in a locked position adjacent to the mechanism adjustment lever.

FIGS. 3 and 4 show a perspective view of a typical deck height adjustment mechanism 28 of a typical lawn mower. The height adjusting mechanism 28 incorporates a pivotable lever 34 that pivots on a pivot mechanism (not shown) on an arc between bracket plates 30. This lever moves the mower cutting deck to a desired position to set the height of the cutting blade with respect to ground. The bracket plate 30 has set holes 32 positioned on the bracket along the arc of the pivotable lever 34. Adjustments to the height of the deck height 24 are accomplished by positioning the pin 10 in a desired set hole 32 with the lever 34 resting against a desired adjustment diameter portion 12, 16, or 20 on the pin stem 11. The first detent surface 14, and the second detent surface 18 are interposed between adjacent adjustment diameter portions 12, 16 and 20 to provide a locking means to prevent the pull pin 10 from slipping away from the lever 34. A cotter pin 38 may be placed in the pin bore 22 to provide further guard against movement of the pin 10.

Figure 5:
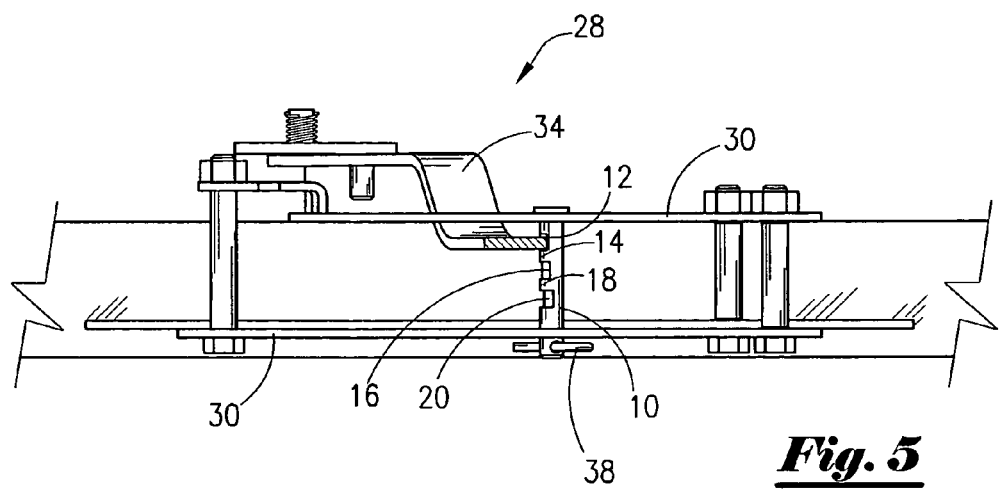
FIG. 5 is a top view of FIG. 4.

The positioning of the lever 34 against a desired diameter portion 12, 16, or 20, as shown in FIG. 5, positions the lever 34 and thus the associated mower deck and mower blade at desired lower positions to more precisely set the cutting level of the grass. This provides a means for establishing closer cutting tolerances and finer height adjustments than manufacturers typically incorporate into the deck height adjustment mechanisms of mowers.

Figure 6:
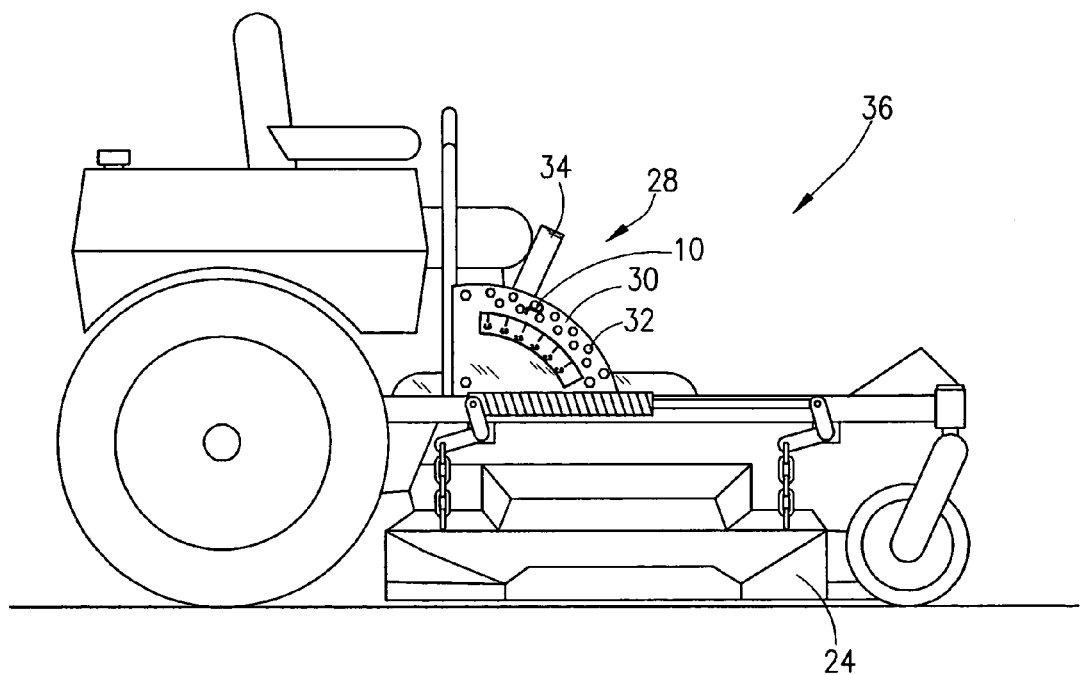
FIG. 6 is side view of a conventional riding lawn mower equipped with a pin and receiving hole deck height adjustment mechanism for use with the pin of FIG. 1.

The pin 10 in combination with the lever and bracket mechanism 28 described above will maintain, as shown in FIG. 6, the cutting deck 24 of a mower 36 at desired incremental levels, each cutting level corresponding to an individual set hole 32 and pin diameter portion 12, 16, or 20 of the pin 10. Once the pull pin 10 is fully disposed in the desired set hole 32, the pin 10 of applicant's invention allows the user to make additional fine incremental adjustments to the cutting deck 24. The operator can make these adjustments by lifting the lever 34 and sliding the pull pin 10 in a set hole 32 until the adjustment lever 34 aligns with a desired diameter portion of the pin stem such as the first diameter adjustment portion 12. Such lever and pin alignment engages the first detent means 14 to hold the pin 10 in a fixed position and prevents the lever 34 from sliding along the stem 11.

The mower deck 24 can be manipulated further through continued handling of the precision pull pin 10. Once the adjustment lever 34 is aligned with the first adjustment diameter portion 12 the operator may make further changes of the cutting deck height by displacing the pin 10 inwardly or outwardly until either the first, second, third or subsequent diameter adjustment portion, 12, 16 or 20, are aligned with the adjustment lever 34 and the corresponding detent means 14 or 16 are engaged. A pin 10 can be provided to make staged adjustments to the mower deck 24 simply by adding additional adjustment diameter portions along the length of the pin stem. Preferably a pin 10 or multiple pins 10 can be provided to make deck height adjustments in desired incremental stages preferably as low as $\frac{1}{16}$".

Figure 7:
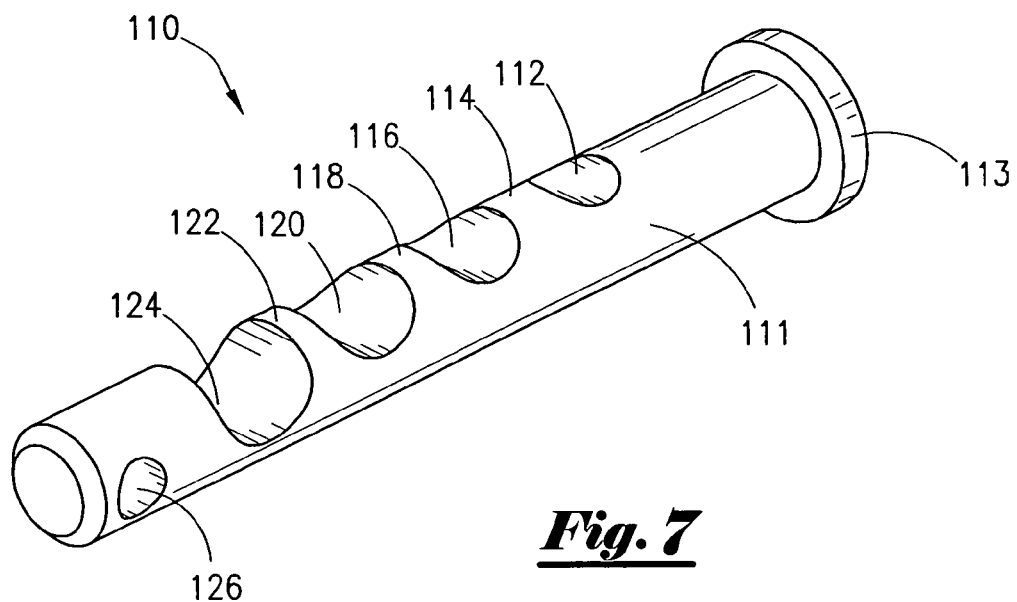
FIG. 7 is alternate embodiment of the pin of FIG. 1.
Figure 8:
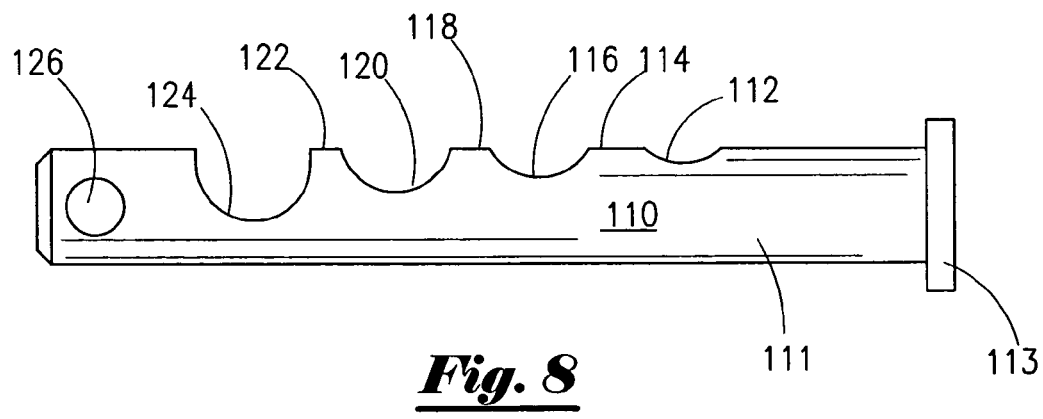
FIG. 8 is a side view of the pin of FIG. 7.

An alternative arrangement of the Applicant's invention is illustrated in FIGS. 7 and 8. There the elongated pull pin 110 has a stem 111 of a uniform diameter that extends from a pin head 113 along an elongated axial centerline. The pin stem 111 has first, second, third and fourth reduced diameter portions 112, 116, 120, 124 that are shaped to conform to the shape of a desired lever arm, in this case the reduced diameter portions are curved. The stem 111 is also comprised of detent surfaces 114, 118 and 124 positioned between the reduced diameter portions as well as a bore 126 for a cotter pin if so desired.

While the principles of providing a mower deck height adjustment for making precision adjustments to the cutting deck height of a mower having pin-and-receiving hole mechanisms have been made clear by the above disclosure, it will be immediately apparent to those skilled in the art that there are many possible modifications to the disclosed arrangement without departing from the basic spirit and scope of the present invention as defined in the following claims.

I claim:

1. A method of fixing the deck height of a lawn mower comprising;
   (a) providing a mower having a cutting deck height adjusting mechanism that incorporates a pivotable lever that pivots on an arc between a pair of bracket plates to provide adjustments to the height of said deck, each of said bracket plates having a plurality of corresponding set holes positioned on said bracket plates along the arc of said pivotable lever;
   (b) providing a pin having a stem of uniform diameter disposed along an axial centerline; said stem of said pin having a plurality of adjustment diameter portions each said diameter portion being successively reduced with respect to the uniform stem diameter;
   (c) placing said pin through a selected corresponding pair of said set holes on said bracket plates;
   (d) positioning said pin so as to engage a selected adjustment diameter portion of said pin stem with said pivotable lever whereby said lever is detained from downward movement and thereby setting the height of said mower cutting deck at a desired position.

2. The method as recited in claim 1, further comprising the step of providing said pin with detent means positioned adjacent to said adjustment diameter portions.

3. The method as recited in claim 1, further comprising the step of providing said pin with a bore for receiving a retaining pin.

* * * * *